Patented Aug. 18, 1953

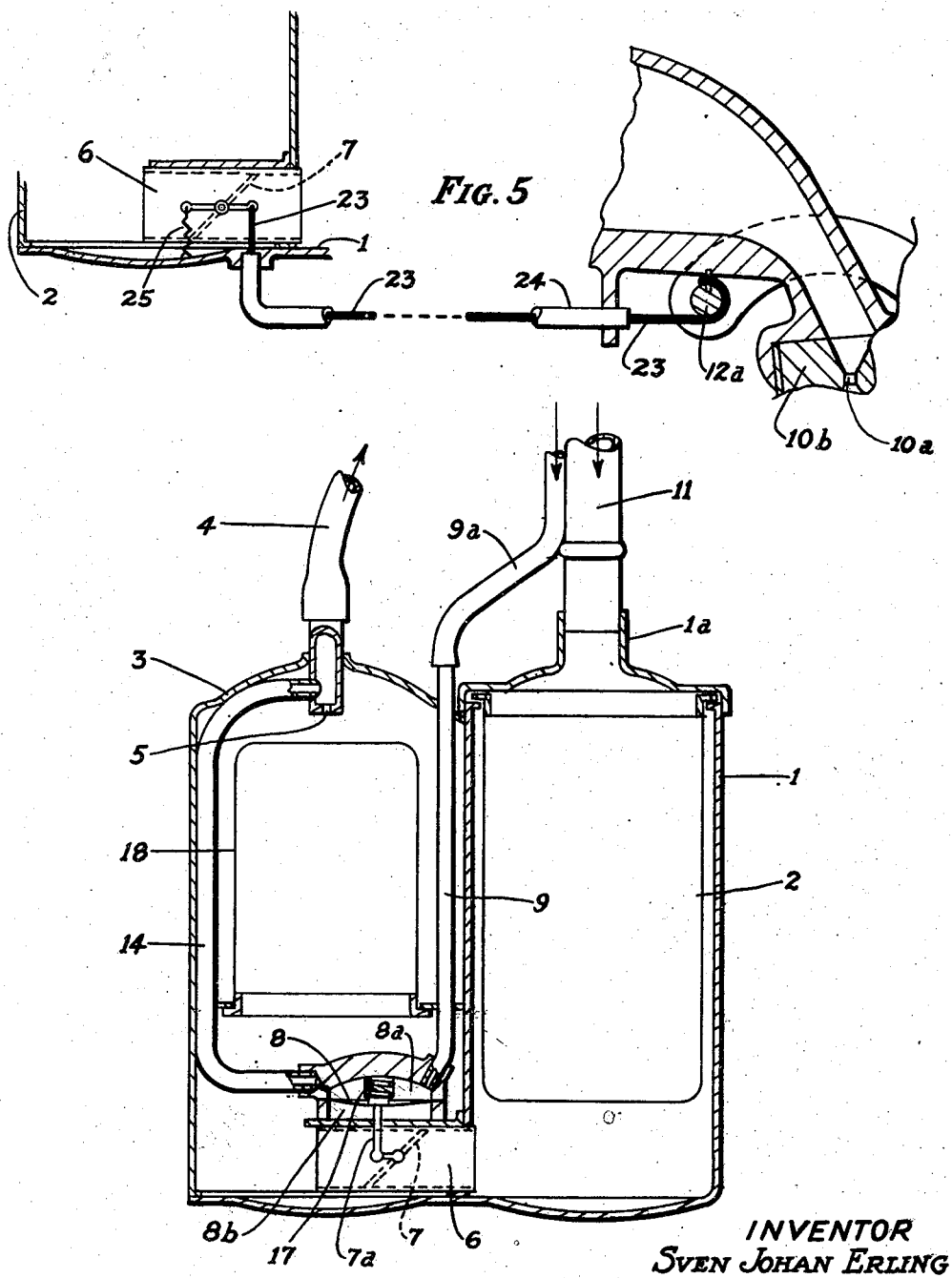

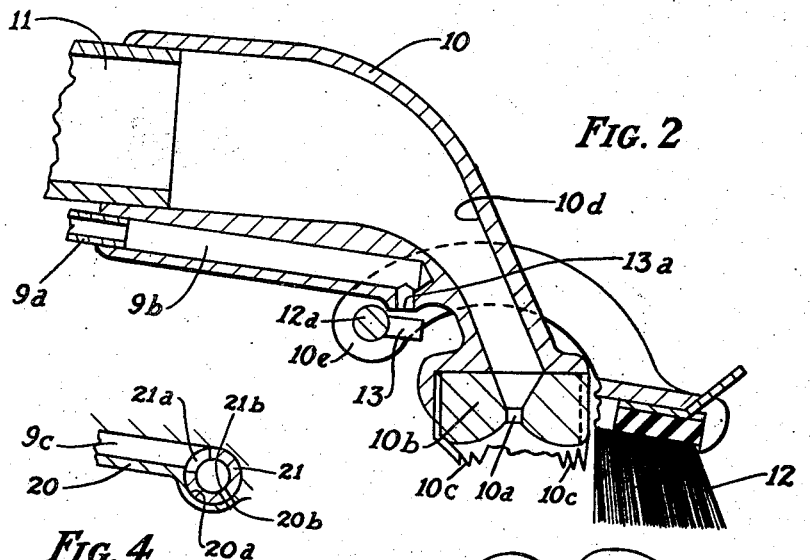
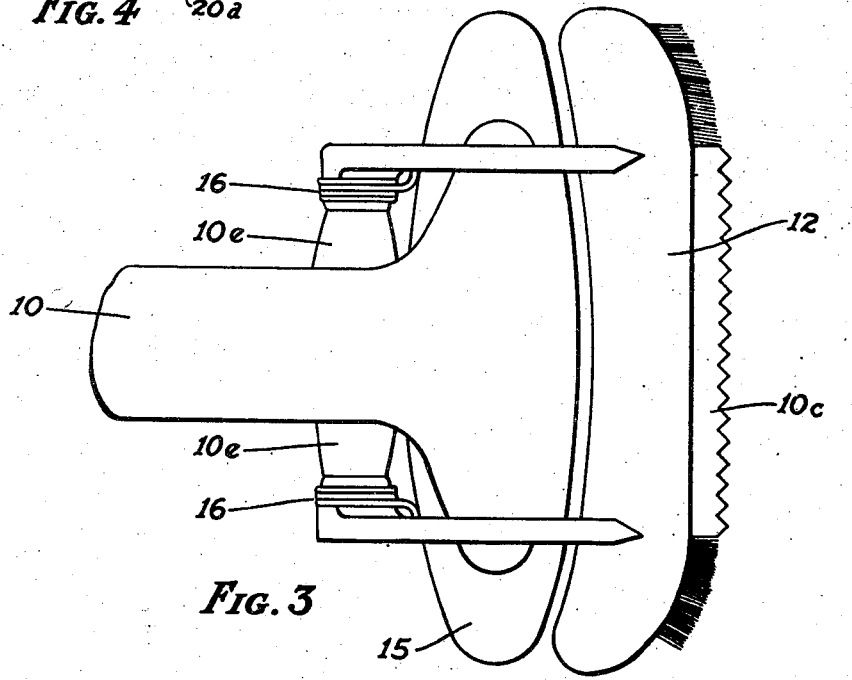

2,648,867

UNITED STATES PATENT OFFICE 2,648,867

CURRYING MACHINE FOR CONNECTION WITH VACUUM SYSTEMS

Sven Johan Erling, Nockeby, Sweden, assignor to Aktiebolaget Separator, Stockholm, Sweden, a corporation of Sweden Application April 19, 1947, Serial No. 742,554
In Sweden May 10, 1946

8 Claims. (Cl. 15—319)

This invention relates to currying machines of the type having a suction nozzle connected to source of vacuum and adapted to be applied to the body of an animal. More particularly, the invention has reference to an improved machine of this character in which, when the nozzle is removed from the animal's body, the air flow is interrupted by a valve to allow vacuum energy to accumulate in the vacuum line beyond the valve until the nozzle is again applied to the animal, the valve being operable reliably over a long period of time, without cleaning, in spite of hairs and dust particles in the air from the nozzle.

For the operation of currying machines, it may be desirable to utilize the vacuum system of milking machine installations as a source of power. It has been found, however, that the vacuum suitable for milking machines is not directly suited for a currying machine. That is, the magnitude of the vacuum used for the milking is many times greater than is necessary for the currying. Furthermore, the quantity of air which can be sucked by the pump of the vacuum milking system is too small for operating a currying machine. Attempts have been made to improve this situation by providing the nozzle of the currying machine with a valve arranged to open when the nozzle is pressed against the animal and to close automatically as soon as the nozzle is removed. Thus, an intermittent stream of air is obtained through the nozzle and the vacuum line, the latter forming a reservoir for the vacuum energy, which accumulates while the valve is closed. Accordingly, a larger quantity of air can stream through the nozzle during the periods when the valve is open, that is, when the nozzle is pressed against the body of the animal. In this way, the air current is limited to the periods when it can actually be of use in the currying. The air current is also limited as to its volume by being considerably throttled as long as the nozzle is kept against the body of the animal. Consequently, the capacity of the air pump will be sufficient even for currying, in that it can maintain a sufficiently high vacuum during the periods when the currying is performed.

While the currying machine above mentioned affords a better operation than prior machines without the automatic valve, it has been found to have the disadvantage that hairs and dust particles are detached from the animal's coat and become stuck in the valve, so that the latter cannot close tightly. It has been found necessary to interrupt the currying at short intervals in order to clean the valve.

The present invention, therefore, is directed to the provision of a currying machine which eliminates this inconvenience. The new machine includes an air filter or dust remover and also a stop valve, both arranged in the vacuum line, the valve, however, being located beyond the dust remover, reckoned in the direction of air flow. Thus, when the air streaming through the suction nozzle arrives at the valve, the air has been freed of hair and dust particles, so that the valve will not become clogged in the currying operation.

According to the invention, the valve is controlled from the nozzle so that the valve opens when the nozzle is applied to the body of the animal, and closes as soon as the nozzle is removed. This control of the valve can be effected either pneumatically or mechanically from the nozzle. It is preferable to provide a separate container beyond the valve in the direction of air flow, the container serving as an accumulator for vacuum energy. The valve will then be located between this container (accumulator) and a container for the dust filter. By virtue of this accumulator, a more rapid evacuation of the dust container is obtained upon opening the valve, thus providing a stronger stream of air through the nozzle.

For a better understanding of the invention, reference may be had to the accompanying drawings, in which Fig. 1 is a vertical sectional view, partly in elevation, of part of a machine made in accordance with the invention, showing a unit including the filter chamber, the valve, and the vacuum energy accumulator;

Fig. 2 is a vertical sectional view of one form of the nozzle which is connected to the unit illustrated in Fig. 1;

Fig. 3 is a plan view of the nozzle shown in Fig. 2;

Fig. 4 is a vertical sectional view of part of a modified form of the nozzle, and Fig. 5 is a vertical sectional view, partly in elevation, of another form of the machine.

Referring to Figs. 1, 2 and 3, a dust container I is provided with a dust bag 2 which acts as a filter for removing hair and other particles from the air stream. Combined with container I is a container 3 serving as an accumulator for vacuum energy and connected with a vacuum system or source of sub-atmospheric pressure (not shown) by a hose line 4. Line 4 is connected with the interior of container 3 through a throttled opening 5 which causes a certain drop of pressure from container 3 to line 4. The two containers I and 3 communicate with each other through a short pipe 6 provided with a throttle or valve 7 by which the pipe can be closed.

The valve 7, as shown, is pivoted in the pipe 6 and is connected to one end of a stem 7ª extending loosely through an opening in the pipe wall. At its upper end, the stem 7ª is connected to a membrane 8 which forms a wall of a chamber 8ª in a housing 8ᵇ located in container 3. The chamber 8ª communicates through an air conduit, consisting of a pipe 9 and a flexible hose 9ª, with a passage 9ᵇ in a nozzle body 10. The latter has an air intake opening 10ᵃ in a nozzle insert 10ᵇ between combs 10ᶜ. The opening 10ᵃ communicates, through an air passage 10ᵈ in the nozzle body and a flexible hose 11, with the neck 1ᵃ of container 1, wherein the filter 2 is interposed between the neck or inlet and the valve 7. It will be understood that the parts 11, 1, 6, 3 and 4 form in effect a pneumatic pipe line for connecting the nozzle to the source of sub-atmospheric pressure (not shown) to which the hose 4 leads.

A brush 12 is pivoted on the nozzle 10 by means of a shaft 12ᵃ rotatable in bearings 10ᵉ on the nozzle. Between the bearings 10ᵉ, the shaft 12ᵃ is provided with a valve member 13 coacting with a valve seat 13ᵃ which opens into passage 9ᵇ and thus communicates with chamber 8ᵃ. This chamber is connected with line 4 by a pipe line 14 which is throttled so that the air pressure in chamber 8ᵃ is higher than in line 4 as long as air is flowing through the chamber. However, when the flow of air is interrupted by the closing of valve 13, the pressure in chamber 8ᵃ assumes the same value as in line 4.

In operation, before the nozzle 10 is applied to the body of the animal, brush 12 is depressed to its lowermost position in relation to the nozzle, as by means of springs 16 (Fig. 3). In this position of the brush, the shaft 12ᵃ holds the valve 13 away from its seat, so that air streams through passage 9ᵇ, the conduit 9ᵃ—9, the chamber 8ᵃ, and pipe 14, to the line 4. The pressure in chamber 8ᵃ, which is now higher than it would be with the valve 13 closed, acts upon membrane 8 (with the assistance of a spring 17, as shown) to maintain the valve 7 closed. Consequently, there is no flow of air through the nozzle opening 10ᵃ and hose 11.

When the nozzle 10 is applied to the body of the animal, brush 12 is pressed upwards on the nozzle and rotates shaft 12ᵃ so as to seat the valve member 13, thereby cutting off the flow of air through conduit 9ᵃ—9 and chamber 8ᵃ. The pressure in the latter chamber will then decrease to the pressure in line 4, which is less than the pressure in container 3 and therefore the pressure on the lower face of membrane 8. As a result, the membrane will flex upwardly and the valve 7 will open to allow the flow of air from nozzle opening 10ᵃ through hose 11, filter 2, valve 7, throttle 5, and line 4 to the vacuum source. When the nozzle 10 is removed from the animal, the brush is again depressed on the nozzle under the action of springs 16, so that the flow of air is resumed through valve seat 13ᵃ and chamber 8ᵃ, thereby closing the valve 7.

It will be apparent that in the new machine, the main flow of air (that is, the flow through nozzle opening 10ᵃ and hose 11) is automatically cut off when the nozzle is removed from the animal, by means of the valve 7 which is located beyond the filter 2 in the direction of air flow from the nozzle. Accordingly, the valve 7 is maintained free of hairs and dust particles and can be operated over a long period of time without cleaning. The valve 13—13ᵃ, which controls the main valve 7, is arranged on the nozzle in a location where it is not subject to the adverse influence of hairs and dust drawn into the nozzle in the currying operation. Although some air will momentarily stream through this valve 13—13ᵃ and eventually into the line 4 after the nozzle is removed from the animal, the flow will be at a negligible rate as compared with the main flow through hose 11, and consequently the vacuum energy can be quickly restored in the system beyond the valve 7 during the periods when the latter is closed.

Since the container 3 acts as a vacuum energy accumulator while the main valve 7 is closed, it causes the adjacent dust container 1 to become evacuated more quickly when valve 7 is opened, whereby a stronger air stream will flow through the nozzle opening 10ᵃ. If desired, the container 3 may also be provided with an air filter, as shown at 18, to remove minute dust particles remaining in the air stream.

It will be understood that the force of the spring 17 will determine the degree of vacuum in chamber 8ᵃ at which the valve 7 is opened and closed, respectively. However, by adjusting the position of the pivot for valve 7, or other factors influencing the opening and closing of the valve, the spring 17 may be eliminated.

In Fig. 4, I have shown a modified form of the nozzle valve for controlling the main valve 7. As there shown, I provide a nozzle 20 which is similar to nozzle 10 except that a hollow shaft 21 is substituted for the shaft 12ᵃ, the shaft 21 being rotatable in a bore 20ᵃ in the nozzle body and being closed at its projecting ends where it is connected to brush 12. Also, in lieu of the passage 9ᵇ and valve seat 13ᵃ, the nozzle 20 is provided with a passage 9ᶜ opening into the bore 20ᵃ. The interior of shaft 21 communicates with passage 9ᶜ at all times through a lateral opening 21ᵃ in the shaft. When the brush is swung down on nozzle 20, an orifice 21ᵇ in shaft 21 is moved into alignment with an orifice 20ᵇ in the nozzle, so that air will flow through the aligned orifices, shaft 21, passage 9ᶜ, and chamber 8ᵃ. When the brush is swung up on the nozzle, the resulting rotation of shaft 21 moves orifice 21ᵇ away from orifice 20ᵇ, so that the air flow is interrupted.

It is possible, of course, to control the main valve 7 from the nozzle through a purely mechanical connection, instead of the pneumatic connection previously described. As shown in Fig. 5, the shaft 12ᵃ of nozzle 10, instead of carrying the valve member 13, is connected to one end of a wire 23 extending through a flexible cable 24 which leads to the container 2. There, the wire 23 extends through the bottom of the container 2 and pipe 6 and is connected to the valve 7. When the brush 12 is swung down on the nozzle 10, the wire is unwound from shaft 12ᵃ, so that spring 25 closes the valve 7. When the brush is swung up on the nozzle, the wire is wound on shaft 12ᵃ and opens the valve 7 against the action of spring 25. To prevent leakage of air into the container 2, the latter may be provided with a suitable gland at the opening through which the wire 23 passes.

From the foregoing it will be understood that the movable brush 12 constitutes a control element for the main valve 7, to which it is connected through an operative connection comprising the parts 13, 9ᵇ, 9ᵃ, 9, 8ᵃ, 8 and 7ᵃ, the chamber 8ᵃ being connected to a source of sub-atmospheric pressure by pipe 14 (Figs. 1–3), or through an operative connection comprising the part 23 (Fig. 5). The membrane 8 and its associated parts constitute a pneumatically operated actuator for the valve 7, this actuator having a control chamber 8ᵃ.

I claim:

1. In a currying machine having a suction nozzle adapted to be applied to the body of an animal, the combination of a pneumatic pipe line for connecting the nozzle to a source of subatmospheric pressure, a filter in said line and adapted to remove dust from the air passing through the line from the nozzle, a normally closed valve in said line on the opposite side of the filter from the nozzle, a valve control element movably mounted on the nozzle and having a protruding part engageable with and displaceable by the animal body when the nozzle is applied to said body, to move the control element relative to the nozzle, and an operative connection between said control element and the valve, whereby said valve is automatically opened when the nozzle is applied to the body of the animal.

2. In a currying machine, the combination as defined in claim 1, in which said valve control element includes a duct rotatably mounted on the nozzle, the duct having an orifice and being rotatable to one position to connect the interior of the duct to atmosphere through said orifice, and to a second position to cut off said last connection, said operative connection including an air conduit communicating with the interior of the duct in both of said positions and leading to the vicinity of said valve, and a membrane operatively connected to the valve and forming a wall of a chamber communicating with the air conduit.

3. In a currying machine, the combination as defined in claim 1, in which said operative connection comprises a wire extending from the valve control element to the valve.

4. For use in a currying machine, a container having two serially connected chambers, one of the chambers having an air inlet for dust-laden air from the currying operation, a filter in said first chamber for removing dust from the air, said chambers communicating with each other through an air passage located beyond the filter, reckoned in the direction of air flow from said inlet, the second chamber having an outlet for filtered air, a normally closed valve in said passage, a membrane in the container forming one wall of a third chamber closed from said two chambers, an operative connection between the membrane and the valve, said outlet from the second chamber having a throttled portion, a duct leading from said third chamber to the outlet beyond said throttled portion reckoned in the direction of air flow, for creating a partial vacuum in said third chamber, the membrane being operable upon variation in the pressure in said third chamber to actuate the valve, an atmospheric air duct leading to said third chamber, and a valve in said air duct for opening and closing the duct to atmosphere and thereby varying the pressure in the third chamber.

5. In a currying machine having a suction nozzle adapted to be applied to the body of an animal, the combination of a pneumatic pipe line for connecting the nozzle to a source of subatmospheric pressure, a filter in said line and adapted to remove dust from the air passing through the line from the nozzle, a normally closed valve in said line on the opposite side of the filter from the nozzle, a valve control element mounted on the nozzle for movement relative thereto, and an operative connection between said element and valve for opening said valve when the nozzle is applied to the body of the animal, said operative connection including a membrane connected to the valve and forming on one side a wall of a chamber communicating with the pipe line at a point rearwardly of said valve, considered with reference to the direction of air flow, whereby said pipe line is adapted to create a partial vacuum in said chamber, an air conduit leading from said chamber to the vicinity of the nozzle, and an air valve connected to said control element and operable thereby to open and close the conduit to atmosphere and thereby vary the pressure on said one side of the membrane, the membrane being otherwise subjected to substantially constant pressure.

6. In a currying machine, the combination as defined in claim 5, comprising also a spring acting on the membrane to determine the pneumatic pressures in said chamber at which said first valve will open and close, respectively.

7. In a currying machine having a suction nozzle adapted to be applied to the body of an animal, the combination of a pneumatic pipe line for connecting the nozzle to a source of subatmospheric pressure, a filter in said line and adapted to remove dust from the air passing through the line from the nozzle, a normally closed valve in said line on the opposite side of the filter from the nozzle, a valve control element mounted on the nozzle for movement relative thereto, and an operative connection between said element and valve for opening said valve when the nozzle is applied to the body of the animal, in which said operative connection includes, a pneumatically operable actuator connected to the valve and having a control chamber communicating with the pipe line at a point located rearwardly of the valve, considered with reference to the direction of air flow, whereby the pipe line is adapted to create a partial vacuum in the chamber, the valve actuator being operable by variations in the pressure in said chamber, an air conduit leading from said chamber to the vicinity of the nozzle, and an air valve connected to said control element and operable thereby to open and close the conduit to atmosphere and thereby operate the valve actuator.

8. In a currying machine, the combination as defined in claim 5, in which the other side of the membrane forms a wall of a substantially constant pressure chamber.

SVEN JOHAN ERLING.

References Cited in the file of this patent

UNITED STATES PATENTS

| Number | Name | Date |
|---|---|---|
| Re. 13,078 | Hammer | Jan. 25, 1910 |
| 219,688 | Castle | Sept. 15, 1879 |
| 310,549 | Woodworth | Jan. 6, 1885 |
| 943,424 | Lacock | Dec. 14, 1909 |
| 1,055,771 | Matchette | Mar. 11, 1913 |
| 1,084,933 | Feeny | Jan. 20, 1914 |
| 1,177,714 | Lull | Apr. 4, 1916 |
| 1,185,354 | Skinner | May 30, 1916 |
| 1,455,116 | Lumley | May 15, 1923 |
| 2,044,830 | Carlstedt | June 23, 1936 |
| 2,074,481 | MacMullen | Mar. 23, 1937 |
| 2,200,026 | Juelson | May 7, 1940 |
| 2,384,458 | Dubay | Sept. 11, 1945 |
| 2,387,893 | Ellis | Oct. 30, 1945 |
| 2,406,915 | Smellie | Sept. 3, 1946 |

FOREIGN PATENTS

| Number | Country | Date |
|---|---|---|
| 54,151 | Denmark | Jan. 10, 1938 |
| 421,664 | Great Britain | Dec. 28, 1932 |
| 597,246 | Germany | May 19, 1934 |